United States Patent Office 3,641,003
Patented Feb. 8, 1972

3,641,003
METHOD OF PREPARING AN α-AMINO-ω-LACTAM
Tomiyasu Ito, Kanagawa-ken, Koichiro Nagata, Tokyo, and Takehiko Ichikawa and Tetsuya Kato, Kanagawa-ken, Japan, assignors to Ajinomoto Co., Inc., Tokyo, Japan
No Drawing. Filed Nov. 4, 1969, Ser. No. 874,066
Claims priority, application Japan, Nov. 18, 1968, 43/84,361
Int. Cl. C07d 41/06
U.S. Cl. 260—239.3
9 Claims

ABSTRACT OF THE DISCLOSURE

α-Amino-ε-caprolactam and its homologs having carbon chains of 5 to 12 members are prepared in high yield from the α-aminocycloalkanone oximes having the same number of carbon atoms by Beckmann rearrangement in the presence of chlorosulfonic acid or sulfur trioxide. The lactams are useful intermediates in the synthesis of the corresponding diamino acids.

---

This invention relates to a method of preparing α-amino-ω-lactams, and particularly to the Beckmann rearrangement of α-aminocyclolakanone oximes.

It has been disclosed in Japanese Patent No. 491,985 that α-amino-ω-caprolactam is obtained when α-aminocyclohexanone oxime is reacted with sulfuric acid or phosphoric acid. The yield of the known method, however, does not normally exceed 20%. The low yield is believed due to the fact that the Beckmann rearrangement involved in the reaction is highly stereospecific in that an alkyl group in anti (trans) position to the hydroxyl group tends to migrate (see Organic Reactions, volume 11, page 5). The hydroxyl group of α-aminocyclohexanone being in the anti-position relative to the amino group, the known reaction results in the formation of predominant amounts of an α-amino-ω-lactam which has no known industrial applications at this time [J. Org. Chem. 26 (1961) 2568].

The object of this invention is a modification of the aforedescribed method which improves the yield of the desired α-amino-ω-lactam.

It has been found that substantially improved yields of α-amino-ω-lactams of the formula

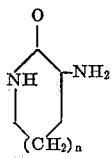

are obtained when the corresponding cycloalkanone oximes of the formula

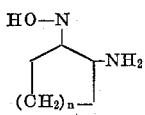

are subjected to Beckmann rearrangement in the presence of chlorosulfonic acid (ClSO₃H) or sulfur trioxide, n being an integer between 1 and 8.

Available evidence indicates that the oxime, regardless of trans- or syn-configuration, is converted to an intermediate of the syn-configuration when chlorosulfonic acid or sulfur trioxide are used as catalysts, and that this fact accounts for the high yields of α-amino-ω-lactam. The assumed sequence of reactions is as follows:

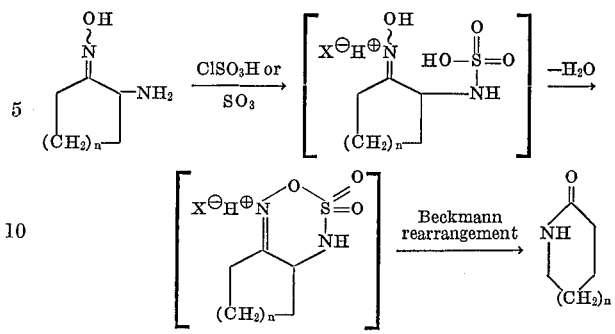

In these formulas, X⊖ is a conjugate base of the acid used.

The oximes, oxime hydrochlorides, and other mineral acid addition compounds of oximes of the following ketones have been used successfully as starting materials for the reaction of this invention:

α-aminocyclopentanone
α-aminocyclohexanone
α-aminocycloheptanone
α-aminocyclooctanone
α-aminocyclononanone
α-aminocyclodecanone
α-aminocycloundecanone
α-aminocyclododecanone This starting materials are prepared in a conventional manner from the corresponding cycloalkylamines by chlorination, Neber rearrangement, and conversion to the oxime [J.A.C.S., 76 (1954) 4561].

The Beckmann rearrangement is brought about by contacting one mol of the oxime with 1 to 6 mols chlorosulfonic acid or sulfur trioxide. The chlorosulfonic acid may be mixed with sulfuric acid. The chlorosulfonic acid may be formed in situ from a mixture of sulfur trioxide or fuming sulfuric acid with hydrogen chloride, a mixture of phosphorus oxychloride with sulfuric acid, a mixture of thionyl chloride with sulfuric acid, or a mixture of sulfuryl chloride with water. Sulfur trioxide is employed either as a solution in a suitable inert organic solvent such as nitrobenzene or a halogenated hydrocarbon, or in the form of fuming sulfuric acid. The reaction is preferably carried out by adding the α-amino-ω-cycloalkanone oxime or its mineral acid addition salt to the catalyst.

The reaction can be carried out at room temperature (about 15° C.), but a reaction temperature of 30° to 100° C. is more conveniently maintained since the reaction is exothermic. The oxime is added to the catalyst at a rate compatible with the capacity of the available cooling system. If so desired, the reaction mixture may be diluted with an organic solvent inert to the reaction mixture to facilitate temperature control. Nitrobenzene, dichloromethane, dichloroethane, trichloroethane, dichloroethylene, and chloroform have been used successfully.

If the starting material is the oxime in the free form, better results are generally obtained when a mineral acid such as sulfuric acid, hydrochloric acid, or phosphoric acid is present in the reaction mixture.

Depending on the specific reaction conditions, the reaction goes to completion within approximately one to five hours.

The α-amino-ω-lactam is conveniently recovered from the reaction mixture as the hydrochloride by the following procedures:

The reaction mixture is added to water, the resulting acidic solution is neutralized with ammonium hydroxide, the lactam is separated from the inorganic components of the mixture by adsorption on a strongly acidic cation exchange resin in the H-form, and the resin is washed with water. If the reaction mixture contains an organic solvent insoluble in water, the mixture is extracted with water, and the extract is further processed as above.

The lactam is eluted from the resin by means of aqueous ammonia, the eluate is evaporated to dryness, and the residue is dissolved in a polar organic solvent, such as ethanol. When hydrogen chloride gas is passed through the solution, the pure lactam hydrochloride is precipitated in crystalline form.

It is also possible to remove volatile components, such as water from the diluted and neutralized reaction mixture, and to extract the residue with alcohol. The lactam hydrochloride is precipitated when hydrogen chloride gas is passed through the alcoholic solution.

The $\alpha$-amino-$\omega$-lactams are readily hydrolyzed to the corresponding diaminocarboxylic acids in high yields. Ornithine, lysine and $\alpha,\lambda$-diaminolauric acid are thus available at relatively low cost by a method which is readily adapted to industrial production.

The following examples are further illustrative of this invention, but it should be understood that the invention is not limited to the examples.

EXAMPLE 1

16.4 g. (0.1 mol) $\alpha$-aminocyclohexanone oxime hydrochloride were added gradually over 90 minutes to a mixture of 23.3 g. (0.2 mol) chlorosulfonic acid and 19.2 g. (0.4 mol) sulfuric acid in a 500 ml. three-neck flask equipped with a stirrer, dropping funnel and reflux condenser and cooled to 40° C. After the addition was completed, the mixture was stirred for one additional hour at 80° C. and was thereafter cooled to room temperature.

The contents of the flask were poured into 200 ml. water, the aqueous solution obtained was neutralized with ammonium hydroxide, and the neutralized solution was passed over a column of Amberlite IR-120 in the H-form, a strongly acidic cation exchange resin. The column was washed with water, and the lactam was eluted with 2 N aqueous ammonia. The eluate was evaporated to dryness, the residue was dissolved in 150 ml. ethanol, and hydrogen chloride gas was passed through the solution. The crystalline precipitate formed thereby was filtered off and consisted of 15.0 g. $\alpha$-amino-$\epsilon$-caprolactam hydrochloride which was identified by its infrared absorption spectrum. When the mother liquor was partly evaporated, an additional crop of 0.75 g. was collected for a total yield of 96%.

When the above procedure was repeated without chlorosulfonic acid in the reaction mixture, the yield of $\alpha$-amino-$\epsilon$-caprolactam was 18%.

EXAMPLE 2

The procedure of Example 1 was followed with a reaction mixture prepared from 32.6 g. (0.28 mol) chlorosulfonic acid at 70° C. and 16.4 g. (0.1 mol) $\alpha$-aminocyclohexanone oxime hydrochloride which was added gradually over a period of one hour with stirring, the mixture being held at 70° C. for an additional hour thereafter. $\alpha$-Amino-$\epsilon$-caprolactam hydrochloride was obtained in the form of crystals weighing 14.5 g. (88% yield).

EXAMPLE 3

120 ml. nitrobenzene were mixed with fuming sulfuric acid containing 24 g. (0.3 mol) sulfur trioxide and 29.4 g. sulfuric acid, and the mixture was kept at 10° C. while 12.9 g. (0.1 mol) $\alpha$-aminocyclohexanone oxime were added in small batches with stirring. The reaction mixture was thereafter kept at 70° C. for three hours, cooled to ambient temperature, and poured into 200 ml. water, whereby two layers were formed. The nitrobenzene layer was extracted with water, and the extract was combined with the water layer. The aqueous solution was neutralized with ammonium hydroxide solution, and the neutralized solution was worked up as in Example 1. Crystalline $\alpha$-amino-$\epsilon$-caprolactam hydrochloride was obtained in an amount of 10.0 g. (61% yield).

EXAMPLE 4

The general procedure of Example 3 was followed with 16.4 g. (0.1 mol) $\alpha$-aminocyclohexanone oxime hydrochloride instead of the free oxime, and the reaction mixture was kept at 70° C. for four hours. The $\alpha$-amino-$\epsilon$-caprolactam hydrochloride was recovered in an amount of 14.0 g. (85% yield).

When the same procedure was repeated with 32.9 g. (0.4 mol) 100% sulfuric acid replacing the fuming sulfuric acid, only 1.64 g. crystalline $\alpha$-amino-$\epsilon$-caprolactam hydrochloride was obtained for a yield of 10%.

EXAMPLE 5

A mixture of 33.6 g. (0.3 mol) thionyl chloride and 39.2 g. (0.4 mol) sulfuric acid was kept at 30° C. while 16.4 g. (0.1 mol) $\alpha$-amino-cyclohexanone oxime hydrochloride were added in small amounts over a period of three hours with stirring. Thereafter, the mixture was kept at 60° C. for 30 minutes. It was further worked up as in Example 1, and 12.0 g. crystalline $\alpha$-amino-$\epsilon$-caprolactam hydrochloride were recovered (73% yield).

EXAMPLE 6

23.3 g. (0.2 mol) chlorosulfonic acid were mixed with 150 ml. dichloroethane, and 16.4 g. (0.1 mol) $\alpha$-aminocyclohexanone oxime hydrochloride were added with stirring at room temperature during 20 minutes. The reaction mixture was further stirred for three hours at 70° C., and worked up as described in Example 3, whereby 12.4 g. $\alpha$-amino-$\epsilon$-caprolactam hydrochloride were obtained (75% yield).

EXAMPLE 7

A mixture of 15.8 g. (0.136 mol) chlorosulfonic acid and 13.4 g. (0.136 mol) 100% sulfuric acid was stirred at 70° C. while 16.4 g. (0.1 mol) $\alpha$-aminocyclohexanone oxime hydrochloride were added gradually over a period of one hour. The mixture was further stirred at the same temperature for one hour and worked up as in Example 1. It yielded 15.1 g. crystalline $\alpha$-amino-$\epsilon$-caprolactam hydrochloride (92% yield).

EXAMPLE 8

750 mg. (3 millimols) $\alpha$-aminocyclododecanone oxime were prepared from $\alpha$-chlorocyclododecanone oxime and were added with stirring in small amounts to a mixture of 700 mg. (6 millimols) chlorosulfonic acid and 1.18 g. (12 millimols) 100% sulfuric acid cooled to 5°–10° C. with ice water. The addition was completed within one hour, and the reaction mixture was thereafter kept at 75° C. for 45 minutes, cooled, added to ice water, and neutralized with aqueous ammonia to pH 7.

The neutralized aqueous liquid was passed over a column of Amberlite IR-120 as in Example 1, the adsorbed product was eluted with ammonium hydroxide, and crystals were precipitated from its solution in ethanol with gaseous hydrogen chloride as described in Example 1. $\alpha$-Amino-$\lambda$-laurolactum hydrochloride of M.P. 240°–241° C. (decomp.) was obtained in an amount of 520 mg. (69% yield). It was identified by elementary analysis.

Calculated for $C_{12}H_{24}ON_4 \cdot HCl$ (percent): 57.93 C.; 10.13 H; 11.26 N. Found (percent): 57.79 C; 10.02 H; 11.07 N.

400 milligrams of the crystals were added to 5 ml. concentrated hydrochloric acid, and the mixture was refluxed for 20 hours. $\alpha,\lambda$-Diaminolauric acid hydrochloride was recovered from the hydrolyzation mixture by conventional treatment with pyridine at 100% of the calculated yield. M.P. 270°–271° C. The compound was identified by elementary analysis.

Calculated for $C_{12}H_{26}O_2N_2 \cdot HCl$ (percent): 54.02 C; 10.20 H; 10.50 N. Found (percent): 54.05 C; 10.24 H; 10.42 N.

EXAMPLE 9

7.6 g. fuming sulfuric acid containing 1.6 g. (0.02 mol) sulfur trioxide were kept at a temperature below 10° C. with ice water while 1.64 g. (0.01 mol) α-aminocyclohexanone oxime hydrochloride was added in small amounts over a period of 30 minutes. The temperature of the mixture was then gradually raised to 70° C. over three hours, and held at 70° C. for 30 minutes. It was further worked up as in Example 1, and 1.52 g. crystalline α-amino - ε - caprolactam hydrochloride was recovered (92.5% yield).

What is claimed is:

1. In a method of producing an α-amino-ω-lactam of the formula

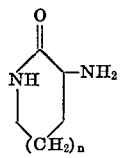

by Beckmann rearrangement of an α-aminocycloalkanone oxime of the formula

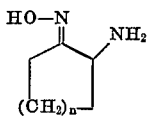

in the presence of a catalyst, in said formulas, $n$ being an integer between 1 and 8, the improvement which comprises the use of chlorosulfonic acid or sulfur trioxide as a catalyst.

2. In a method as set forth in claim 1, said chlorosulfonic acid or sulfur trioxide being in contact with said oxime in an amount of one to six mols per mol of said oxime.

3. In a method as set forth in claim 2, said oxime being in contact with said catalyst while in the form of an addition salt with a mineral acid.

4. In a method as set forth in claim 3, said oxime being in contact with said catalyst at a temperature between 15° and 100° C.

5. In a method as set forth in claim 3, said oxime being in contact with said catalyst while dispersed in a liquid medium.

6. In a method as set forth in claim 5, said medium being sulfuric acid.

7. In a method as set forth in claim 5, said medium being an organic solvent inert to said catalyst, to said oxime, and to said lactam.

8. In a method as set forth in claim 1, said catalyst being chlorosulfonic acid.

9. In a method as set forth in claim 1, said catalyst being sulfur trioxide, said oxime being in contact with said catalyst at a temperature between 30° and 100° C. while dispersed in a liquid medium essentially consisting of sulfuric acid and an organic solvent inert to said catalyst, to said oxime, and to said lactam.

References Cited

UNITED STATES PATENTS

| 2,716,114 | 8/1955 | Blaser et al. | 260—239.3 |
| 2,716,115 | 8/1955 | Blaser et al. | 260—239.3 |
| 2,723,266 | 11/1955 | Lincoln et al. | 260—239.3 |
| 2,744,107 | 5/1956 | Welz | 260—239.3 |
| 3,101,331 | 8/1963 | Turbak et al. | 260—239.3 |

FOREIGN PATENTS

| 18,089 | 10/1966 | Japan | 260—239.3 |

OTHER REFERENCES

Organic Reactions, vol 11, pp. 51–55 (Wiley) (1960), edited by Adams et al.

HENRY R. JILES, Primary Examiner

R. T. BOND, Assistant Examiner

U.S. Cl. X.R.

260—239.3 A, 293.87